US011271223B2

(12) United States Patent
Mugishima et al.

(10) Patent No.: US 11,271,223 B2
(45) Date of Patent: Mar. 8, 2022

(54) FUEL CELL

(71) Applicant: HONDA MOTOR CO., LTD., Tokyo (JP)

(72) Inventors: Takehiro Mugishima, Tochigi-ken (JP); Hitoshi Nagasaki, Tochigi-ken (JP); Akio Fujimoto, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/042,211

(22) PCT Filed: Mar. 26, 2019

(86) PCT No.: PCT/JP2019/012664
§ 371 (c)(1),
(2) Date: Sep. 28, 2020

(87) PCT Pub. No.: WO2019/189060
PCT Pub. Date: Oct. 3, 2019

(65) Prior Publication Data
US 2021/0020961 A1    Jan. 21, 2021

(30) Foreign Application Priority Data
Mar. 30, 2018    (JP) .............................. JP2018-069792

(51) Int. Cl.
*H01M 8/0263* (2016.01)
*H01M 8/2418* (2016.01)
*H01M 8/1004* (2016.01)

(52) U.S. Cl.
CPC ....... *H01M 8/0263* (2013.01); *H01M 8/1004* (2013.01); *H01M 8/2418* (2016.02)

(58) Field of Classification Search
CPC . H01M 8/0263; H01M 8/2418; H01M 8/1004
See application file for complete search history.

(56) References Cited

U.S. PATENT DOCUMENTS

2017/0162883 A1    6/2017    Imura et al.

FOREIGN PATENT DOCUMENTS

WO    2015/129206    9/2015

OTHER PUBLICATIONS

International Search Report and Written Opinion for International Application No. PCT/JP2019/012664 dated May 21, 2019, 7 pages.

*Primary Examiner* — Helen Oi K Conley
(74) *Attorney, Agent, or Firm* — Amin, Turocy & Watson, LLP

(57) ABSTRACT

This fuel cell is provided with a first electrolyte membrane electrode structure and a second electrolyte membrane electrode structure, respective cathode electrodes of which face each other with an oxidant gas supply layer being interposed therebetween. The oxidant gas supply layer has: a first projection part which presses an interconnect part of an electrolyte membrane that constitutes the first electrolyte membrane electrode structure; and a second projection part which presses an interconnect part of an electrolyte membrane that constitutes the second electrolyte membrane electrode structure.

3 Claims, 7 Drawing Sheets

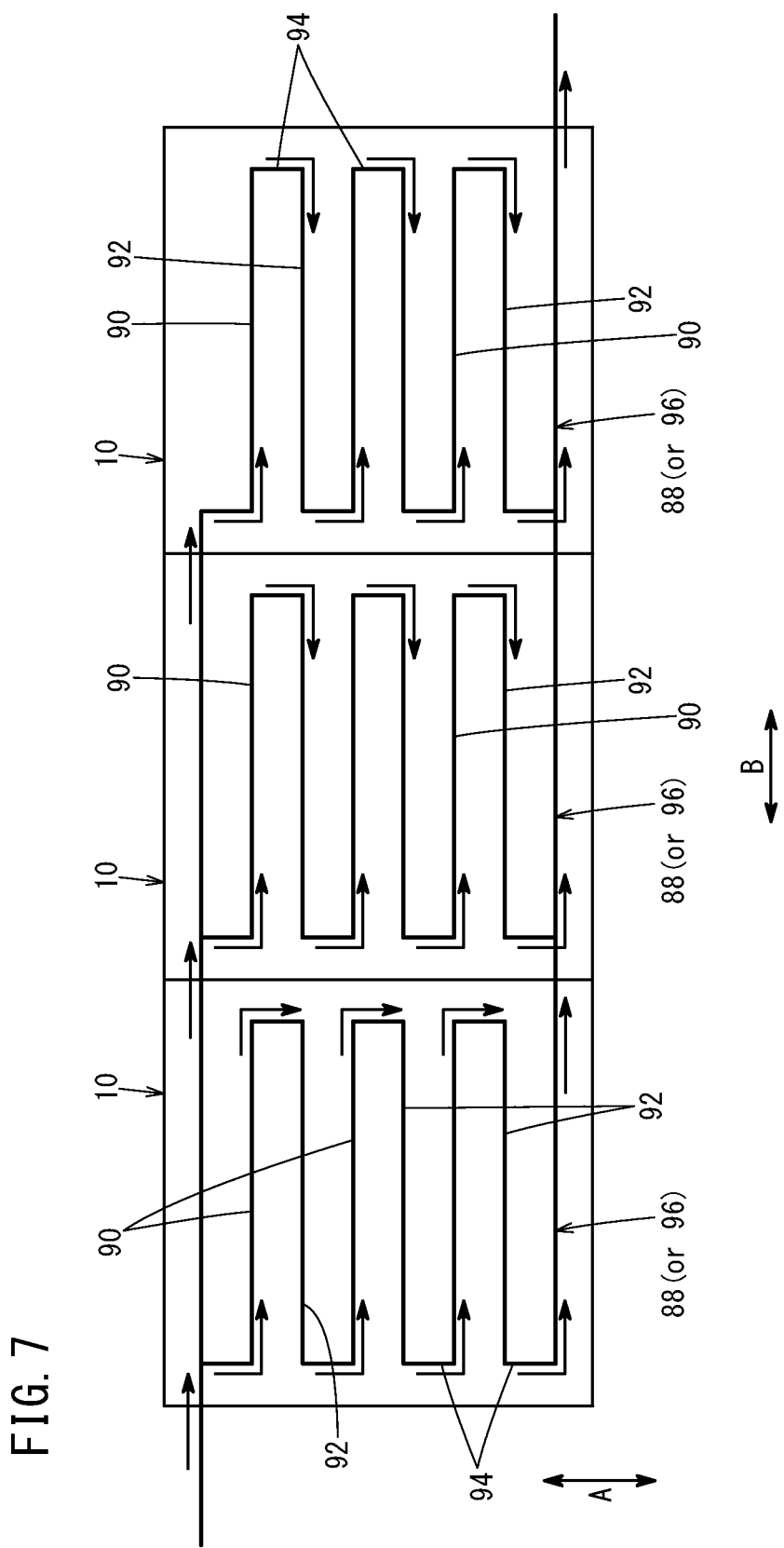

FUEL CELL

TECHNICAL FIELD

The present invention relates to a fuel cell including a plurality of membrane electrode assemblies each formed by providing a plurality of anodes and a plurality of cathodes for one electrolyte membrane.

BACKGROUND ART

A typical fuel cell is formed by stacking a plurality of unit cells together. Each of the unit cells is obtained by sandwiching a membrane electrode assembly (MEA) between a pair of separators. This structure is known as a fuel cell stack. In contrast, in recent years, it is proposed to provide a fuel cell using a membrane electrode assembly having a planar shape in which a plurality of anodes and a plurality of cathodes are provided for one electrolyte electrode assembly to form a plurality of unit cells.

In this regard, International Publication No. WO 2015/129206 discloses a fuel cell including the two membrane electrode assemblies. In the fuel cell, an anode (or a cathode) of the membrane electrode assembly on the lower side and an anode (or a cathode) of the membrane electrode assembly on the upper side face each other. That is, in this case, the same electrodes face each other, and the same reactant gas is supplied between both of the electrodes.

SUMMARY OF INVENTION

In the case of adopting the structure, an interconnecting section for electrically connecting the adjacent unit cells together is formed in the electrolyte membrane. That is, a plurality of unit cells are connected together in series through the interconnecting section. In this regard, in the case when the contact resistance between the interconnecting section and the anode or the cathode is large, electron conduction is hindered, and may cause decrease in the electromotive force of the fuel cell.

A main object of the present invention is to provide a fuel cell in which it is possible to reduce the contact resistance between an interconnection section and an anode or a cathode.

According to an embodiment of the present invention, a fuel cell is provided. The fuel cell includes a first membrane electrode assembly and a second membrane electrode assembly, the first membrane electrode assembly and the second membrane electrode assembly each including a single electrolyte membrane in which interconnecting sections are formed, the interconnecting sections extending in a first direction and having conductivity in a membrane thickness direction of the electrolyte membrane, a plurality of anodes extending in the first direction, and disposed remotely from each other in a second direction perpendicular to the first direction, and a plurality of cathodes extending in the first direction, and disposed remotely from each other in the second direction, wherein the cathodes of the first membrane electrode assembly and the cathodes of the second membrane electrode assembly face each other, each of the first membrane electrode assembly and the second membrane electrode assembly has a zigzag layout where, in the second direction, part of one of the anodes faces part of one of two cathodes that are adjacent to each other, among the cathodes, through the electrolyte membrane, and another part of the one anode faces part of the remaining one of the two cathodes through one of the interconnecting sections formed in the electrolyte membrane, the interconnecting sections of the first membrane electrode assembly and the interconnecting sections of the second membrane electrode assembly are offset from each other in the second direction, the fuel cell further includes an oxygen-containing gas supply layer for supplying an oxygen-containing gas to the cathodes of the first membrane electrode assembly and the cathodes of the second membrane electrode assembly, in the oxygen-containing gas supply layer, a plurality of first protrusions which contact the cathodes of the first membrane electrode assembly and a plurality of second protrusions which contact the cathodes of the second membrane electrode assembly are provided alternately, and the first protrusions are positioned in a manner to press the interconnecting sections of the first membrane electrode assembly, and the second protrusions are provided in a manner to press the interconnecting sections of the second membrane electrode assembly.

As described above, in the present invention, the first protrusions and the second protrusions of the oxygen-containing gas supply layer press the interconnecting sections. Therefore, since the contact resistance between the interconnecting sections and the anodes or the cathodes is reduced, electron conduction from the interconnecting sections to the cathodes proceeds smoothly. As a result, the internal resistance of the fuel cell is decreased, and the electromotive force of the fuel cell is increased.

That is, by adopting the structure, it is possible to obtain a fuel cell having a large electromotive force. Further, since the spaces formed by the first protrusions and the cathodes of the second membrane electrode assembly and the spaces formed by the second protrusions and the cathodes of the first membrane electrode assembly can be used as the oxygen-containing gas supply channels, though the first protrusions and the second protrusions are provided in the oxygen-containing gas supply layer, the structure of the fuel cell is not complicated.

Preferably, the fuel cell includes a cathode side porous film interposed between the plurality of cathodes and the first protrusions or the second protrusions in a manner to cover the cathodes, wherein a breathing hole as a passage of the oxygen-containing gas is provided only at a position of the cathode side porous film spaced from the first protrusions or the second protrusions. By adopting the structure where the oxygen-containing gas passes through this breathing hole, it is possible to supply the oxygen-containing gas to the cathode covered with the cathode side porous film without any problems.

Further, the water produced in electrochemical reaction is discharged through the breathing hole. That is, since the cathode side porous film is present, some volume of water produced in the reactions is stored in the cathodes side porous film. Therefore, since it is possible to avoid excessive drying of the cathode and/or the electrolyte membrane, proton conduction of the electrolyte membrane becomes suitable.

The breathing hole is not formed at a position which contacts the first protrusion or the second protrusion. Therefore, it is possible to avoid the situations where the water produced in the reactions contacts the first protrusion or the second protrusion and causes electric conduction through liquid.

Further, preferably, at positions in the cathodes or the anodes, or in both the cathodes and the anodes, where correspond to the interconnecting sections, the electrode catalyst layer is not present. As described above, at the position where the electrode catalyst layer is not present, no electrode reactions occur. Therefore, it is possible to avoid the situations where the excessive water produced in the reactions is retained on the contact interface between the interconnecting sections and the electrodes and the electric conduction through liquid occurs as a result of this phenomenon.

In the present invention, the oxygen-containing gas supply layer for supplying an oxygen-containing gas to the cathodes of the two membrane electrode assemblies is provided. In the present invention, a plurality of first protrusions and a plurality of second protrusions which contact the cathodes are provided alternately, and the first protrusions and the second protrusions press the interconnecting sections of the two membrane electrode assemblies. Therefore, the contact resistance between the interconnecting sections and the anodes or the cathodes is reduced, and electrons are transmitted from the interconnecting section to the cathodes easily. Therefore, since the internal resistance of the fuel cell is reduced, it is possible to obtain a fuel cell having a large electromotive force.

BRIEF DESCRIPTION OF DRAWINGS

FIG. 7 is a schematic plan view showing flow directions of hydrogen when a plurality of fuel cells are coupled together in parallel.

DESCRIPTION OF EMBODIMENTS

Hereinafter, a preferred embodiment of the present invention will be described with reference to the accompanying drawings. The following expressions "lower", "upper", "left", and "right" correspond particularly to the lower side, the upper side, the left side, and the right side in FIG. 3. However, these directions are defined for ease of understanding the present invention, and are not intended to define the directions when the fuel cell is used.

Figure 1:
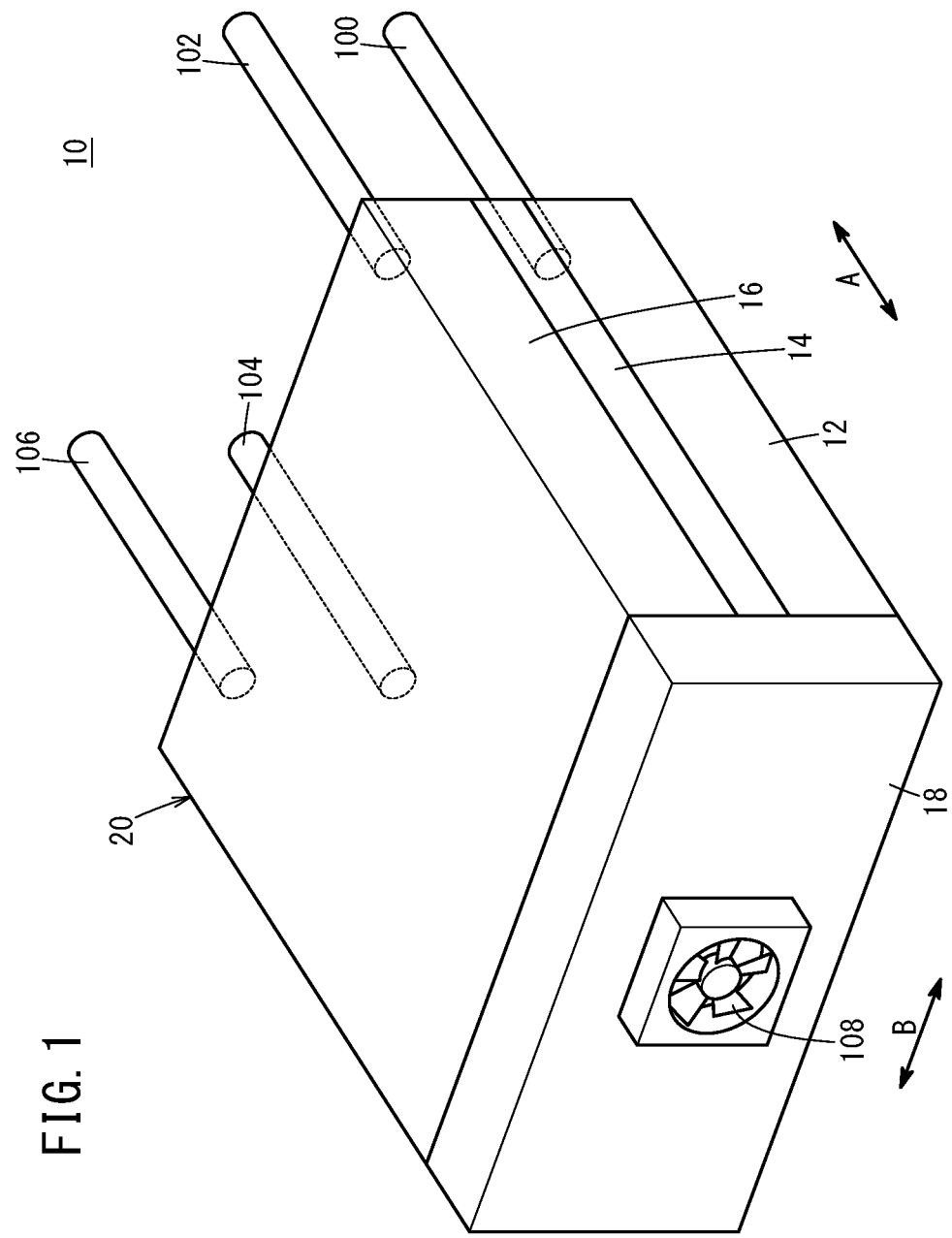
FIG. 1 is an overall perspective view schematically showing a fuel cell according to an embodiment of the present invention.
Figure 2:
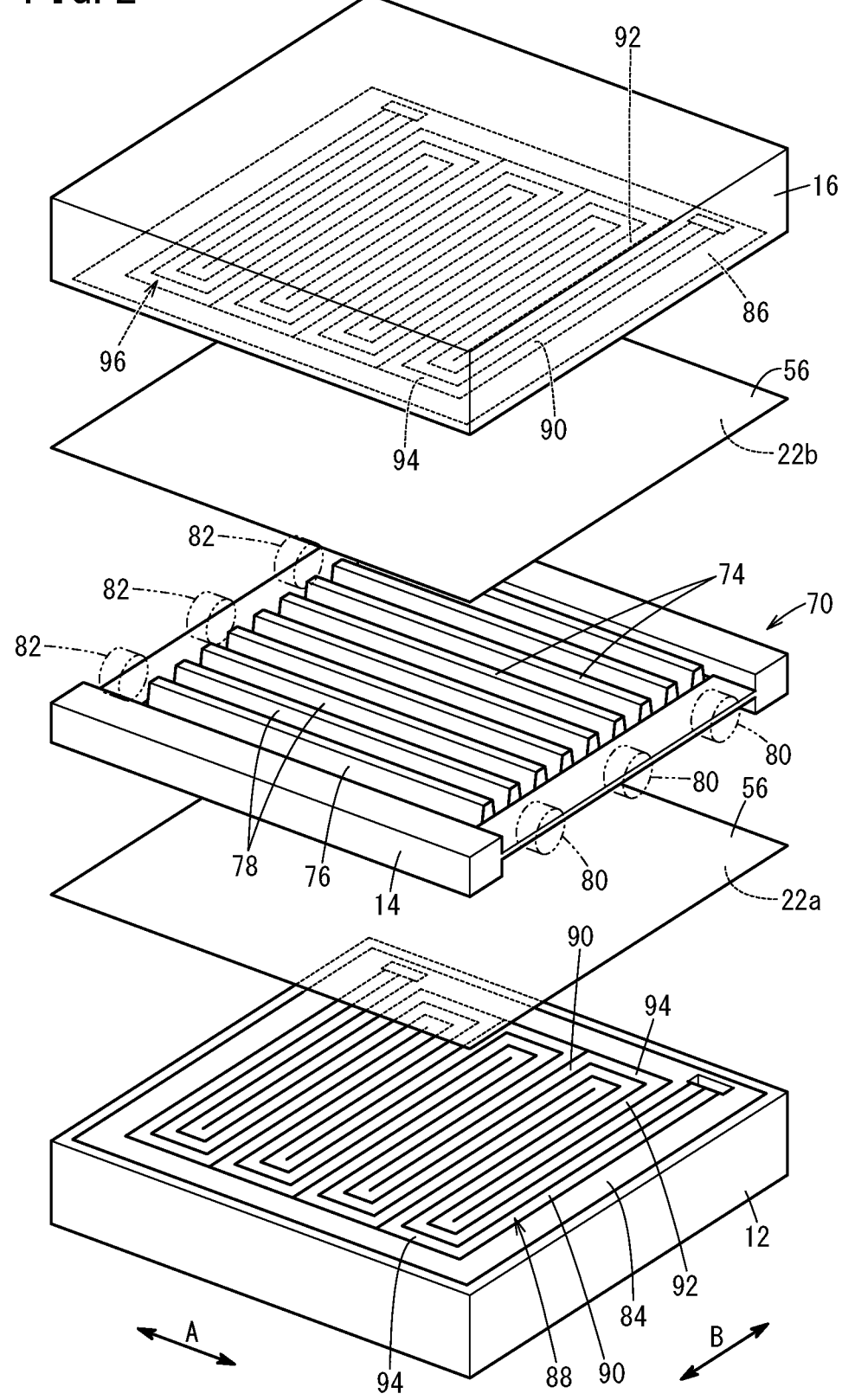
FIG. 2 is an exploded perspective view showing main components of the fuel cell in FIG. 1.
Figure 3:
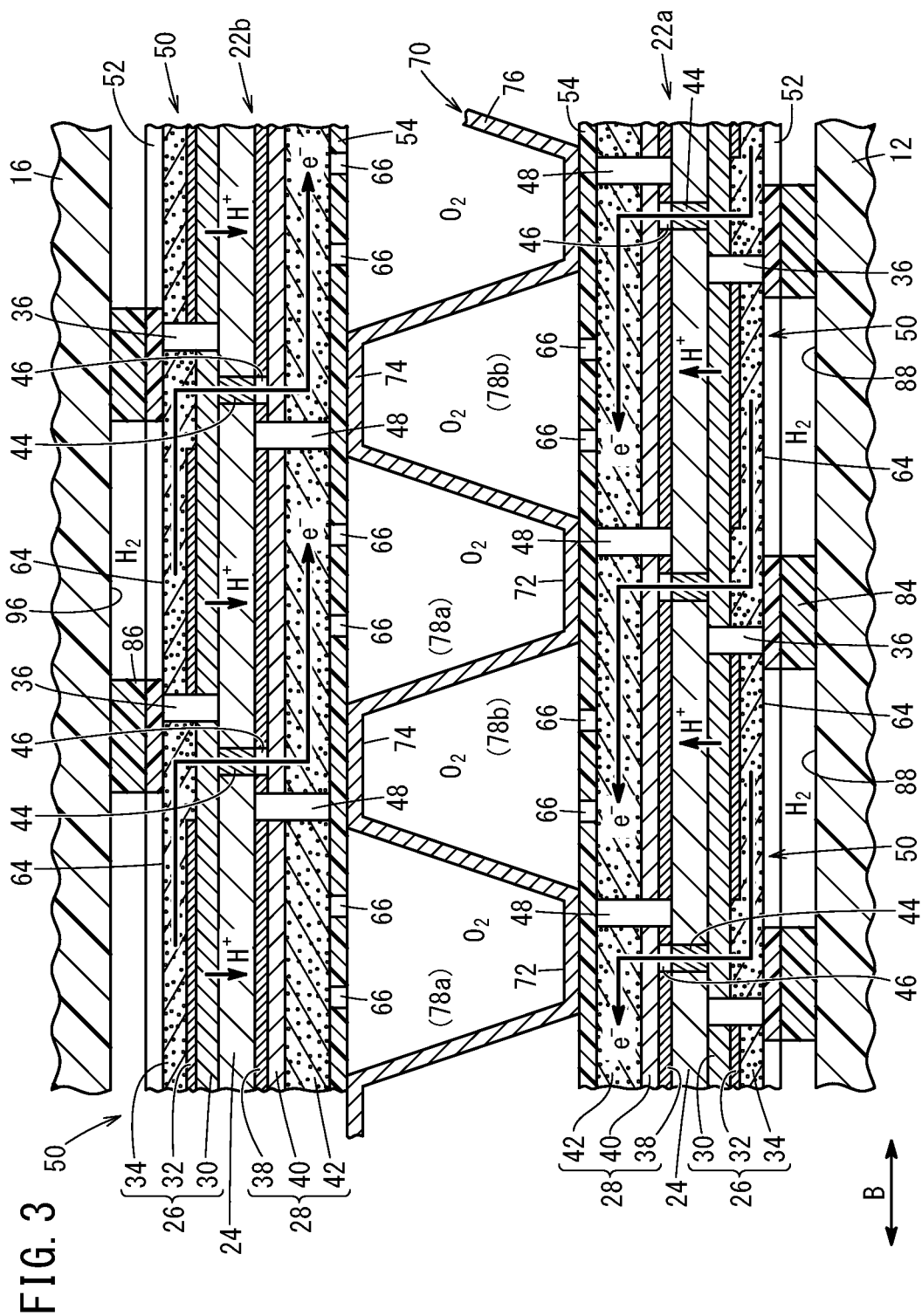
FIG. 3 is a vertical cross sectional view showing main components of a fuel cell in FIG. 1.

FIG. 1 is an overall perspective view schematically showing a fuel cell 10 according to the embodiment, FIG. 2 is an exploded perspective view showing main components of the fuel cell 10 according to the embodiment, and FIG. 3 is a vertical cross sectional view showing main components of the fuel cell 10 according to the embodiment. In the fuel cell 10, a lower housing member 12, a support panel 14 of an oxygen-containing gas supply layer 70 described later, an upper housing member 16, and a fan attachment member 18 shown in FIG. 1 are assembled together to form a substantially rectangular parallelepiped housing 20.

As shown in FIGS. 2 and 3, a first structural body 22a as a first membrane electrode assembly on the lower side and a second structural body 22b as a second membrane electrode assembly on the upper side are accommodated in the housing 20. Firstly, the first structural body 22a and the second structural body 22b will be described. It should be noted that the structural bodies 22a, 22b have substantially the same structure. However, for ease of explanation, in FIGS. 2 and 3, the first structural body 22a positioned on the lower side will be referred to as the "lower MEA", and the second structural body 22b positioned on the upper side will be referred to as the "upper MEA". Further, in the following description, the "Ca side" and the "An side" mean the side closer the cathode, and the side closer to the anode, respectively.

As shown in FIG. 3 in detail, the lower MEA 22a includes a single electrolyte membrane 24. A plurality of anodes 26 are formed on the lower end surface of the electrolyte membrane 24, and a plurality of cathodes 28 are formed on an upper end surface of the electrolyte membrane 24. Specifically, on the lower end surface of the electrolyte membrane 24, an An side protection layer 30, an An side electrode catalyst layer 32, and an An side gas diffusion layer 34 are stacked together in this order from the side closer to the electrolyte membrane 24 to form one anode 26. The An side protection layer 30, the An side electrode catalyst layer 32, and the An side gas diffusion layer 34 form a band shape extending in a direction indicated by an arrow A (first direction) in FIG. 1. That is, the anode 26 extends in the longitudinal direction indicated by the arrow A.

The width of the An side electrode catalyst layer 32 in the direction indicated by the arrow B (second direction) is smaller than the width of the An side protection layer 30 and the width of the An side gas diffusion layer 34. Therefore, the An side protection layer 30 and the An side gas diffusion layer 34 are partially in direct contact with each other. It should be noted that the An side protection layer 30 is a thin membrane of perfluorosulfonic acid containing water.

A plurality of the anodes 26 having the above structure are arranged in the direction indicated by the arrow B. The adjacent anodes 26 are spaced from each other through an An side groove 36.

On the other hand, on the upper end surface of the electrolyte membrane 24, a Ca side protection layer 38, a Ca side electrode catalyst layer 40, and a Ca side gas diffusion layer 42 are stacked together in this order from the side closer to the electrolyte membrane 24 to form one cathode 28. The Ca side protection layer 38, the Ca side electrode catalyst layer 40, and the Ca side gas diffusion layer 42 form a band shape extending in the direction indicated by the arrow A (first direction) shown in FIGS. 1 and 2. That is, as in the case of the anode 26, the cathode 28 extends in the longitudinal direction indicated by the arrow A.

It should be noted that the width of the Ca side electrode catalyst layer 40 and width of the Ca side gas diffusion layer 42 in the direction indicated by the arrow B (second direction) are substantially the same. In contrast, the Ca side protection layer 38 is formed in a manner that a plurality of non-contact holes 46 are scattered along the direction (direction indicated by the arrow A) in which interconnecting sections 44 described later extends. Further, for example, the Ca side protection layer 38 is made of thin membrane of perfluorosulfonic acid polymer containing carbon black.

The plurality of the cathodes 28 having the above structure are provided in the direction indicated by the arrow B. The cathodes 28 that are adjacent to each other are spaced from each other through a Ca side groove 48.

The Ca side grooves 48 are formed at positions offset from the An side grooves 36. Further, the interconnecting section 44 is positioned between the An side groove 36 and the Ca side groove 48. Therefore, the one anode 26 is bridged over the two cathodes 28 that are adjacent to each other through the Ca side groove 48. That is, a zigzag layout is adopted in a manner that, in the direction indicated by the arrow B, part of one anode 26 faces part of one of the cathodes 28 through the electrolyte membrane 24, and another part of the anode 26 faces part of another one of the adjacent cathodes 28 through one of the interconnecting sections 44. The part of the anode 26 and the part of the cathode 28 that face each other through the electrolyte membrane 24 form a unit cell 50.

The interconnecting sections 44 formed in the electrolyte membrane 24 are provided over the electrolyte membrane 24 in the membrane thickness direction from the An side protection layer 30 to the Ca side protection layer 38, and have a band shape extending in the direction indicated by the arrow A. In the electrolyte membrane 24, electron conduction occurs mainly in the interconnecting sections 44, and proton conduction occurs mainly in portions other than the interconnecting sections 44.

The lower MEA 22a having the above structure is laminated by an An side film 52 (anode side porous film) and a Ca side film 54 (cathode side porous film). That is, the An side film 52 and the Ca side film 54 have the large area in comparison with the lower MEA 22a, and the outer marginal portions of the An side film 52 and the Ca side film 54 exposed from the lower MEA 22a are joined together. Thus, a laminate layer 56 is formed.

The An side film 52 and the Ca side film 54 are made of material having heat resistance in the operating temperature (several tens to 100° C.) of the fuel cell 10 such as resin. In particular, it is preferable if the An side film 52 and the Ca side film 54 are made of transparent resin, because it is possible to visually and easily recognize the state where, e.g., the lower MEA 22a is enclosed, and the An side film 52 and the Ca side film 54 are joined together. Specific examples of such resin include polyimide resin.

The lower MEA 22a is thin. Though the lower MEA 22a is soft sufficiently to be warped by its own weight when only the lower MEA 22a is held, rigidity of the lower MEA 22a is increased to some extent by enclosing the lower MEA 22a into the laminate layer 56. That is, to the extent that the lower MEA 22a and the laminate layer 56 are held altogether, the lower MEA 22a is not warped by its own weight. Therefore, it becomes easy to handle the lower MEA 22a, e.g., transport the lower MEA 22a. Further, since the shape of the lower MEA 22a is maintained, it is possible to avoid deformation such as warpage of the lower MEA 22a.

Figure 4:
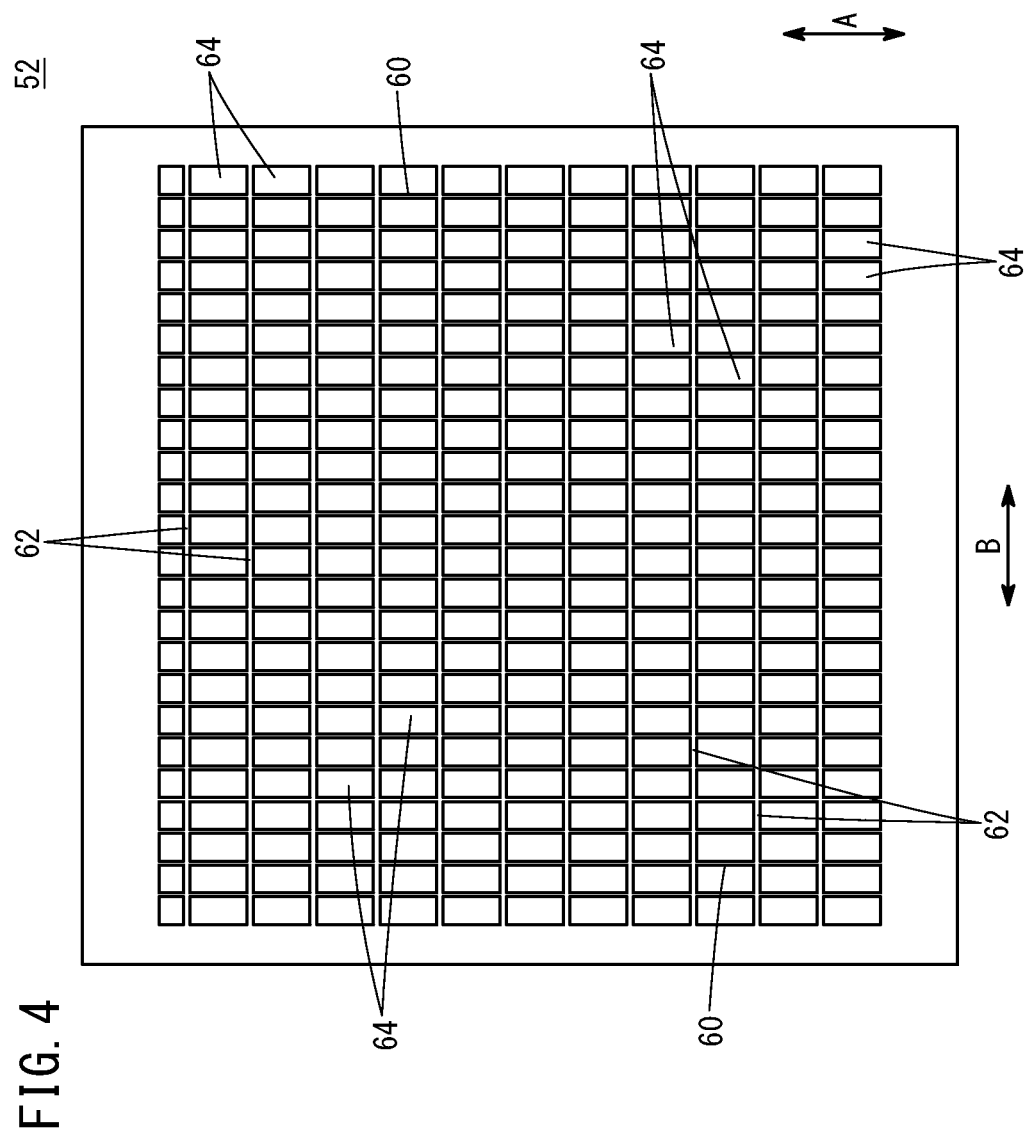
FIG. 4 is a schematic plan view showing an An side film (anode side porous film) of a laminate layer.

As shown in FIG. 4, the An side film 52 is provided in tight contact with the plurality of the anodes 26, respectively. The An side film 52 includes a plurality of first straight segments 60 superimposed on the interconnecting sections 44, and extend in the direction indicated by the arrow A, and a plurality of second straight segments 62 extending in the direction indicated by the arrow B perpendicular to the first straight segments 60. That is, the An side film 52 has a lattice shape where the first straight segments 60 and the second straight segments 62 extend perpendicularly to each other. By intersection of the two first straight segments 60 and the two second straight segments 62, an An side breathing hole 64 having a substantially rectangular shape surrounded by the four straight segments 60, 60, 62, 62 is formed.

On the other hand, Ca side breathing holes 66 are formed in the Ca side film 54 (see FIG. 3). The thickness of the Ca side film 54 is smaller than the thickness of the An side film 52. Stated otherwise, the thickness of the An side film 52 is larger than the thickness of the Ca side film 54.

The upper MEA 22b has substantially the same structure as the lower MEA 22a. Therefore, the constituent elements of the upper MEA 22b that are identical to those of the lower MEA 22a are labelled with the same reference numerals, and the description thereof is omitted.

In the lower MEA 22a, the anode 26 is provided below the electrolyte membrane 24, and the cathode 28 is provided above the electrolyte membrane 24. In the upper MEA 22b, the cathode 28 is provided below the electrolyte membrane 24, and the anode 26 is provided above the electrolyte membrane 24. That is, in the fuel cell 10, the cathode 28 of the lower MEA 22a and the cathode 28 of the upper MEA 22b face each other.

The unit cells 50 of the lower MEA 22a and the unit cells 50 of the upper MEA 22b are in different phases. That is, positions of the An side grooves 36, the Ca side grooves 48, and the interconnecting sections 44 of the lower MEA 22a are determined to be positions offset from the An side grooves 36, the Ca side grooves 48, and the interconnecting sections 44 of the upper MEA 22b.

Figure 5:
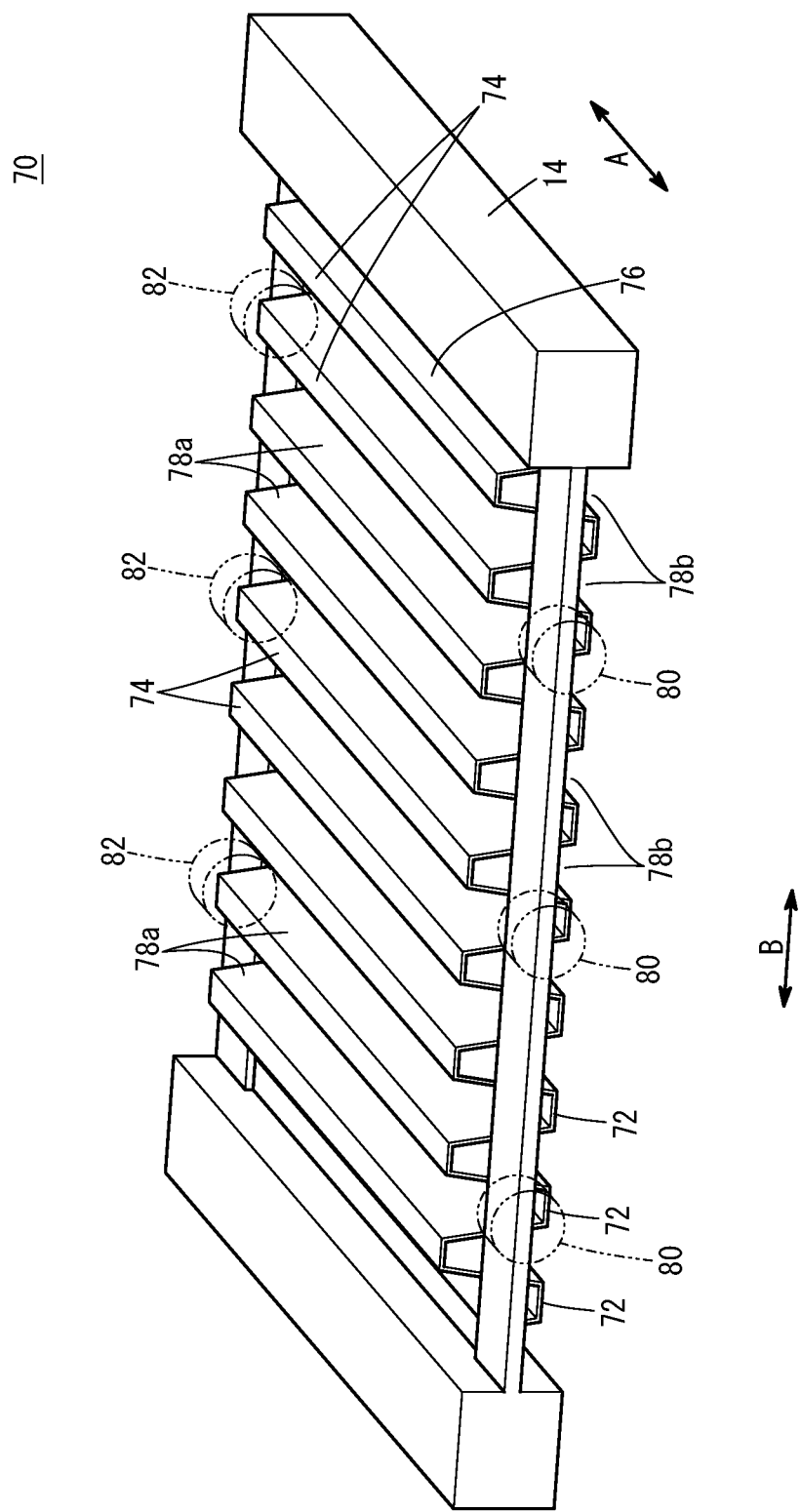
FIG. 5 is an overall perspective view showing an air supply layer (oxygen-containing gas supply layer) of the fuel cell.

An air supply layer 70 (oxygen-containing gas supply layer) shown in detail in FIG. 5 is inserted between the lower MEA 22a and the upper MEA 22b. For example, the air supply layer 70 is made of material having high heat conductivity such as aluminum, copper, or alloy of the aluminum and copper, and includes a fin 76 having a wavy shape where lower protrusions 72 (first protrusions) and upper protrusions 74 (second protrusions) are arranged alternately. The lower protrusions 72 contact the Ca side film 54 of the lower MEA 22a, and the upper protrusions 74 contact the Ca side film 54 of the upper MEA 22b. It should be noted that insulating treatment may be applied to the surface of the fin 76.

The lower protrusions 72 are superimposed on the interconnecting sections 44 of the electrolyte membrane 24 of the lower MEA 22a (see FIG. 3). Further, the upper protrusions 74 are superimposed on the interconnecting sections 44 of the electrolyte membrane 24 of the upper MEA 22b. That is, the fin 76 has a wavy shape where the lower protrusions 72 correspond to the positions of the interconnecting sections 44 of the lower MEA 22a, and the upper protrusions 74 correspond to the positions of the interconnecting sections 44 of the upper MEA 22b.

A space extending in the direction indicated by the arrow A is formed between the lower protrusion 72 and the Ca side film 54 of the upper MEA 22b. Likewise, a space extending in the direction indicated by the arrow A is formed between the upper protrusion 74 and the Ca side film 54 of the lower MEA 22a as well. These spaces serve as upper air supply channels 78a (oxygen-containing gas supply channel) for supplying air (oxygen-containing gas) to the cathodes 28 of the upper MEA 22b, and lower air supply channels 78b (oxygen-containing gas supply channel) for supplying air to the cathodes 28 of the lower MEA 22a.

The Ca side breathing holes 66 formed in the Ca side film 54 are connected to the upper air supply channels 78a or the lower air supply channels 78b. That is, the Ca side breathing holes 66 are formed at positions which do not contact the lower protrusions 72 or the upper protrusions 74.

Further, the air supply layer 70 includes the support panel 14 which supports the fin 76, and which is inserted between the upper housing member 16 and the lower housing member 12 (see FIG. 5). The support panel 14 is provided with discharge ducts 80 which are opened at positions adjacent to the fan attachment member 18 (on the front side) when the housing 20 is set-up, and inlet ducts 82 which are opened on the rear side. As described above, the inlet ducts 82 are configured to take air flowing through the upper air supply channels 78a and the lower air supply channels 78b from the outside to the inside of the housing 20. The discharge ducts 80 are configured to discharge the air flowing through the upper air supply channels 78a and the lower air supply channels 78b to the outside of the housing 20.

The front ends of the inlet ducts 82 and the discharge ducts 80 are configured to be provided at positions slightly shifted from the front end and the rear end of the support panel 14 toward the deeper sides. Therefore, a first buffer space and a second buffer space each having predetermined volume are formed between the inlet ducts 82 or the discharge ducts 80 and the fan attachment member 18.

The support panel 14 is provided with two Ca side current collectors and a Ca side terminal (not shown) electrically connected to the cathodes 28 of the lower MEA 22a and the upper MEA 22b individually, and two An side current collectors and an An side terminal (not shown) electrically connected to the anodes 26 individually. The external load can be connected electrically to the Ca side terminals and the An side terminals.

Further, a lower side hydrogen supply layer 84 (fuel gas supply layer) for supplying the hydrogen gas as the fuel gas is provided below the lower MEA 22a. An upper side hydrogen supply layer 86 (fuel gas supply layer) in the form of a substantially flat plate is provided above the upper MEA 22b as well. The lower side hydrogen supply layer 84 and the upper side hydrogen supply layer 86 are supported by the lower housing member 12 and the upper housing member 16, respectively (see FIG. 2).

Figure 6:
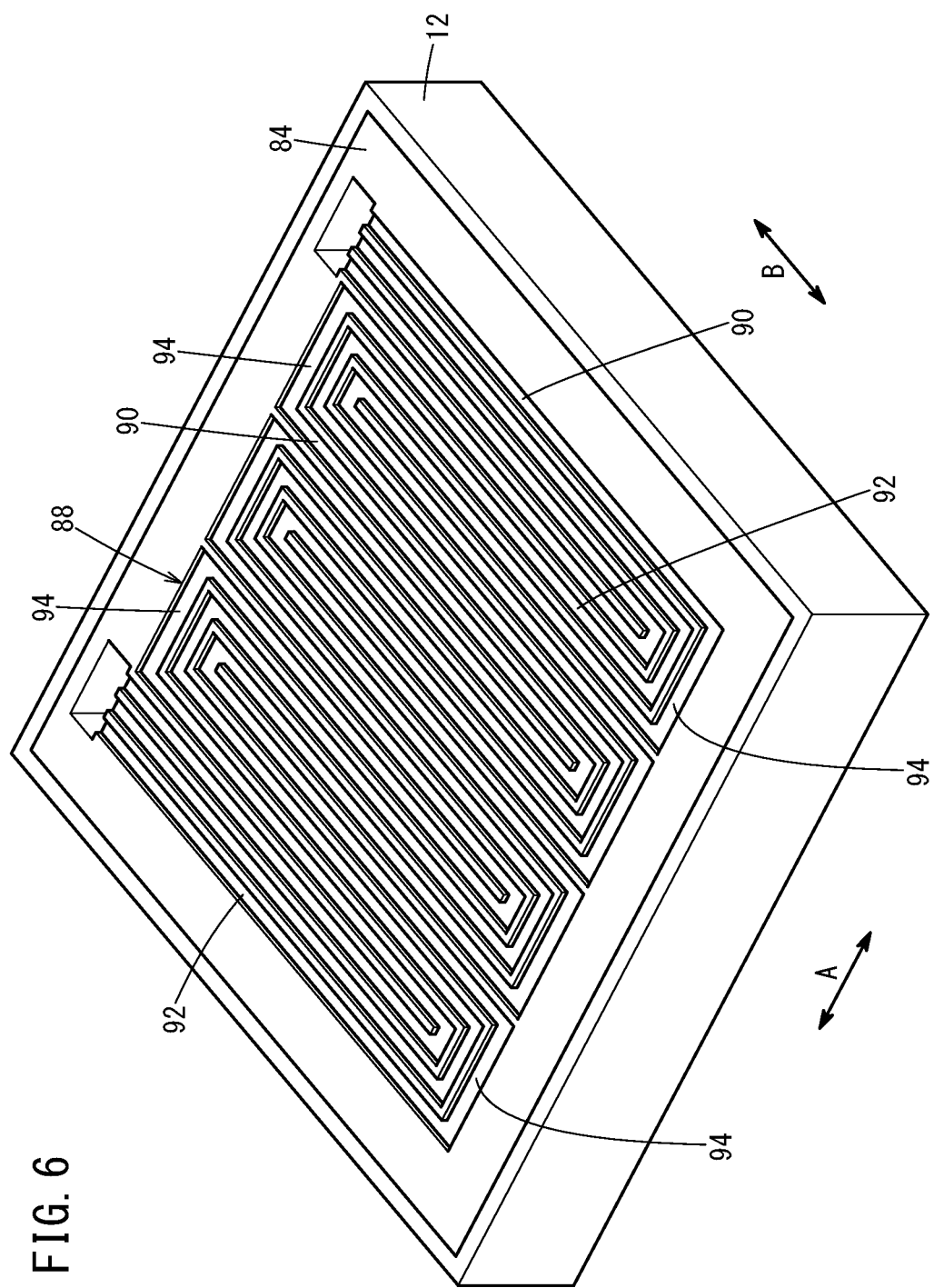
FIG. 6 is an overall schematic perspective view showing a lower side hydrogen supply layer (fuel gas supply layer) of the fuel cell.

As shown in FIG. 6, lower side hydrogen supply channels 88 (fuel gas supply channels) are formed on the end surface of the lower side hydrogen supply layer 84 facing the anode 26 of the lower MEA 22a, in a manner to be depressed downward from the end surface. The lower side hydrogen supply channels 88 include a plurality of onward channels 90 and return channels 92 extending in the direction indicated by the arrow B. The onward channels 90 and the return channels 92 are arranged alternately in parallel to each other. Further, the onward channels 90 and the return channels 92 are connected through connection channels 94 extending in the direction indicated by the arrow A. That is, each of the lower side hydrogen supply channels 88 is a serpentine type channel having a so-called serpentine shape where the straight channels turn back through the connection channels 94.

In the lower side hydrogen supply layer 84, the lower side hydrogen supply channels 88 are grooves, and the other portions are walls. As shown in FIG. 3, the walls are bridged from the portion of one of the anodes 26 where the An side electrode catalyst layer 32 is not present to the portion of another anode 26 adjacent to the one anode 26 where the An side electrode catalyst layer 32 is not present. Therefore, the An side grooves 36 are closed by the walls. Further, the interconnecting sections 44 are superimposed on the walls through the anodes 26.

On the other hand, upper side hydrogen supply channels 96 (fuel gas supply channel) are formed on an end surface of the upper side hydrogen supply layer 86 adjacent to the anode 26 of the upper MEA 22b, in a manner to be depressed upward from the end surface. Each of the upper side hydrogen supply channels 96 is a serpentine type channel including the onward channels 90, the return channels 92, and the connection channels 94, formed in the same manner as the lower side hydrogen supply channels 88. Further, in the upper side hydrogen supply layer 86, the walls other than the upper side hydrogen supply channels 96 in the form of a groove close the An side grooves 36, and are superimposed on the interconnecting sections 44 through the anodes 26.

The lower housing member 12 and the upper housing member 16 are provided with a lower supply manifold 100 and an upper supply manifold 102 for supplying the hydrogen into the housing 20, and a lower discharge manifold 104 and an upper discharge manifold 106 for discharging the hydrogen from the inside of the housing 20 (see FIG. 1). Further, the fan attachment member 18 attached in a manner to bridge over the lower housing member 12 and the upper housing member 16 is provided with a fan 108 (negative pressure generation unit) for generating the negative pressure in the housing 20.

For example, the lower housing member 12 and the upper housing member 16 are tightened together by fastening members such as bolts/nuts. By this tightening, the support panel 14 is held between the lower housing member 12 and the upper housing member 16. Further, for example, the fan attachment member 18 is coupled to the lower housing member 12 and the upper housing member 16 by fastening members such as bolts/nuts.

The fuel cell 10 according to the embodiment of the present invention basically has the above structure. Next, operation and advantages of the fuel cell 10 will be described in relation to operation of the fuel cell 10.

As described above, the lower MEA 22a and the upper MEA 22b are enclosed into the laminate layer 56 where the Ca side film 54 covering all of the cathodes 28 and the electrolyte membrane 24 and the An side film 52 covering all of the anodes 26 and the electrolyte membrane 24 are joined together. Since the laminate layer 56 is hard enough not to be warped by its own weight, the laminate layer 56 can be handled easily. Therefore, at the time of assembling the fuel cell 10, for example, it is possible to easily perform operation of inserting the lower MEA 22a and the upper MEA 22b between the lower housing member 12 and the support panel 14 or between the support panel 14 and the upper housing member 16.

Further, as a result of tightening the lower housing member 12 and the upper housing member 16, the interconnecting sections 44 of the electrolyte membrane 24 of the lower MEA 22a are pressed by the lower protrusions 72 of the air supply layer 70 and the lower housing member 12. Likewise, the interconnecting sections 44 of the electrolyte membrane 24 of the upper MEA 22b are pressed by the upper protrusions 74 of the air supply layer 70 and the upper housing member 16. Preferably, the pressing force against the lower MEA 22a and the upper MEA 22b is not more than 5 MPa.

Further, since a plurality of unit cells 50 are provided on the same plane surface, it is possible to obtain the fuel cell 10 having a large electromotive force even though the fuel cell 10 has a small size.

At the time of operating the fuel cell 10, the external load (e.g., motor, etc.) is electrically connected to the Ca side terminal, and the An side terminal exposed to the outside of the housing 20. Further, while the temperature of the fuel cell 10 is increased to about several tens to 100° C., rotation of the fan 108 is actuated, and hydrogen is supplied from a hydrogen supply source (not shown) into the housing 20 through the lower supply manifold 100 and the upper supply manifold 102.

As a result of rotation of the fan 108, the air in the housing 20 (in particular, the lower air supply channels 78b and the upper air supply channels 78a) is sucked toward the fan 108. After the sucked air flows from the discharge ducts 80 provided in the support panel 14 to the first buffer space, the air is discharged to the outside of the housing 20 through the fan 108. Therefore, the pressure in the housing 20 becomes a negative pressure.

The inlet ducts 82 provided in the support panel 14 are positioned on the rear side of the housing 20. Since the pressure in the housing 20 is a negative pressure, the air outside the housing 20 is guided into the housing 20 through the inlet ducts 82. The guided air is sucked by the fan 108. As a result, the air flows along the lower air supply channels 78b and the upper air supply channels 78a toward the fan 108. That is, the air flows through the lower air supply channels 78b and the upper air supply channels 78a.

In this process, some of the air flows into the laminate layer 56 through the Ca side breathing holes 66 formed in the Ca side film 54, and then, after the air is diffused through the Ca side gas diffusion layer 42, the air reaches the Ca side electrode catalyst layer 40. In this manner, the air is supplied to the cathodes 28.

In the meanwhile, the hydrogen guided from the lower supply manifold 100 into the housing 20 flows into the onward channels 90 of the lower side hydrogen supply channels 88, and flows in the direction indicated by the arrow B. Further, hydrogen flows from the distal end of the onward channels 90 through the connection channels 94 and enters the return channels 92 to turn back, and then, flows again in the direction indicated by the arrow B. Also at the distal ends of the return channels 92, the hydrogen flows through the connection channels 94, and enters the onward channels 90 to turn back, and flows again in the direction indicated by the arrow B. That is, after the hydrogen flows from the anode 26 which is closest to the lower supply manifold 100 on the upstream side to move across each of the anodes 26, the hydrogen flows back from the anode 26 which is closest to the lower discharge manifold 104, and flows in a manner to move across each of the anodes 26 again. While repeating movement in such a serpentine pattern, the hydrogen moves toward the lower discharge manifold 104.

In this process, some of the hydrogen enters the laminate layer 56 through the An side breathing holes 64 formed in the An side film 52, and then, after the hydrogen is diffused through the An side gas diffusion layer 34, the hydrogen reaches the An side electrode catalyst layers 32. That is, hydrogen is supplied to each of the anodes 26. The redundant hydrogen is discharged to the outside of the housing 20 from the lower discharge manifold 104.

In each of the An side electrode catalyst layers 32, hydrogen is ionized to produce protons and electrons. The protons are mainly conducted through the portion of the electrolyte membrane 24 other than the interconnecting sections 44, and reach the Ca side electrode catalyst layers 40. In the meanwhile, the electrons move toward the cathode 28 of the adjacent unit cell 50 mainly through the interconnecting sections 44 of the electrolyte membrane 24.

Further, at the cathode 28, in the Ca side electrode catalyst layer 40, the protons and the electrons, and the oxygen in the air are combined together to produce water. The water moves together with, e.g., hydrogen, and flows along the lower side hydrogen supply channels 88. Therefore, the hydrogen flowing through the lower side hydrogen supply channels 88 becomes highly humidified as it moves toward the downstream side (lower discharge manifold 104).

In the case where the onward channels 90 and the return channels 92 of the lower side hydrogen supply channels 88 extend in the direction indicated by the arrow A, after the hydrogen flows through the one anode 26 to contact one of the anodes 26 entirely, the hydrogen flows in a manner to contact another anode 26 adjacent to the one anode 26 entirely. That is, low humidity hydrogen contacts the anode 26 on the upstream side, and high humidity hydrogen contacts the anode 26 on the lower side. As described above, in the case where the hydrogen having a different humidity is supplied to each of the anodes 26, there is a concern that the power generation amount of the unit cells 50 may vary, and power generation of the fuel cell 10 becomes unstable.

In contrast, in the present embodiment, the onward channels 90 and the return channels 92 of the lower side hydrogen supply channels 88 extend across the plurality of the anodes 26. Therefore, the hydrogen contacts the one anode 26 a plurality of times while increasing the humidity. That is, the hydrogen having a different humidity does not contact each of the anodes 26. Therefore, the power generation amount of arbitrary one of the unit cells 50 and the power generation amount of the unit cell 50 which is different from this arbitrary unit cell 50 become substantially the same. Thus, it is possible to eliminate the concern that power generation of the fuel cell 10 becomes unstable.

Further, the interconnecting sections 44 are superimposed on the walls of the lower side hydrogen supply layer 84 through the anodes 26, and the walls of the upper side hydrogen supply layer 86 are superimposed on the interconnecting sections 44 through the anodes 26. Therefore, that is, the walls of the lower side hydrogen supply layer 84 and the upper side hydrogen supply layer 86 press the electrolyte membrane 24. As a result, the shapes of the lower MEA 22a and the upper MEA 22b are maintained.

The majority of the produced water is maintained within the laminate layer 56. Therefore, since the lower MEA 22a (in particular, the electrolyte membrane 24) is maintained in the humidified state, the sufficient proton conductivity is obtained in the electrolyte membrane 24. Further, since the laminate layer 56 is made of insulating material, it is possible to prevent short circuiting by the contact of the cathode 28 and the fin 76.

The redundant produced water is discharged from the Ca side breathing holes 66 formed in the Ca side film 54 to the lower air supply channels 78b. In this regard, the Ca side breathing holes 66 are not formed in the portions which contact the lower protrusions 72. Therefore, it is possible to avoid electric conduction through liquid between the fin 76 and the lower protrusions 72.

Further, the walls of the lower side hydrogen supply layer 84 and the fin 76 press the lower MEA 22a. Therefore, the shape of the lower MEA 22a is maintained. Further, the interconnecting sections 44 are pressed by the lower protrusions 72 and the upper protrusions 74 of the fin 76, and the pressing force is efficiently transmitted to the interconnecting sections 44 through the first straight segments 60 of the An side film 52. As a result, since the contact resistance at the contact interface between the interconnecting sections 44 and the Ca side electrode catalyst layers 40 is reduced, electronic conductivity becomes suitable.

Further, non-contact holes 46 scattered along the direction indicated by the arrow A are formed at the positions of the Ca side protection layer 38 corresponding to the positions of the interconnecting sections 44. Further, in each of the anodes 26, the An side electrode catalyst layer 32 is not present at positions corresponding to the interconnecting sections 44 and the non-contact holes 46. Therefore, at the positions adjacent to the non-contact holes 46, occurrence of the electrode reactions at the interface between the interconnecting sections 44 and the Ca side electrode catalyst layer 40 or the An side electrode catalyst layer 32 is suppressed. Stated otherwise, production of the water is suppressed. Therefore, it is possible to avoid electric conduction through liquid resulting from the water produced excessively at the contact interface of the interconnecting sections 44, the cathode 28, and the anode 26.

It is a matter of course that the above points are applicable to the upper MEA 22b as well.

As described above, the operating temperature of the fuel cell 10 is about several tens to 100° C. Further, as a result of inducing the electrode reactions, the lower MEA 22a and the upper MEA 22b are heated. In this regard, the air flows through the lower air supply channels 78b and the upper air supply channels 78a, and the fuel cell 10 is cooled by this air. As a result, it is possible to avoid excessive increase in the temperature of the fuel cell 10. Thus, the fuel cell 10 is a so-called air cooled fuel cell.

Further, since the lower MEA 22a and the upper MEA 22b are cooled by the air (heat is removed), it is possible to avoid excessive drying of the cathodes 28. Further, the water produced in the electrode reactions is prevented from being discharged to the outside from the positions other than the Ca side breathing holes 66 and/or the An side breathing holes 64 formed in the laminate layer 56. That is, some volume of water is stored in the laminate layer 56. By the above process, the humidity of the An side gas diffusion layer 34 and the humidity of the Ca side gas diffusion layer 42 are maintained suitably. Therefore, since the humidity of the electrolyte membrane 24 is maintained, the predetermined proton conductivity is maintained.

The present invention is not limited to the above described embodiment. It is a matter of course that various modifications may be made without departing from the gist of the present invention.

For example, another MEA may be stacked on at least one of the position below the lower MEA 22a and the position above the upper MEA 22b. In this case, it is adequate that the anode 26 forming the other MEA is oriented to face the anode 26 of the lower MEA 22a or the anode 26 of the upper MEA 22b.

Further, as shown in FIG. 7, a plurality of the fuel cells 10 may be arranged in parallel in the horizontal direction. In this case, it is adequate that the hydrogen is guided in a manner that the hydrogen is distributed to each of the fuel cells 10 individually to flow into the housing 20.

Further, the embodiment adopts structure where the lower supply manifold 100, the lower discharge manifold 104, the upper supply manifold 102, and the upper discharge manifold 106 are provided as the supply manifolds for guiding the fuel gas such as the hydrogen into the housing 20, and discharge manifolds for discharging the fuel gas from the housing 20, and the supply manifolds and the discharge manifolds are provided for both of the lower housing member 12 and the upper housing member 16. In this manner, fuel gas is supplied into, and discharged from the lower MEA 22a and the upper MEA 22b individually. Alternatively, for example, a single supply manifold may be provided for the upper housing member 16, and a single discharge manifold may be provided for the lower housing member 12.

In this case, it is adequate to provide the two connection holes in the area where there is no unit cell 50 of the lower MEA 22a and the upper MEA 22b to distribute/supply the fuel gas such as the hydrogen from the upper housing member 16 to the lower MEA 22a through one connection hole, and allow the excessive fuel gas from the upper MEA 22b to flow through the lower housing member 12 through the remaining one connection passage for merging the excessive fuel gas from the upper MEA 22b and the excessive fuel gas from the lower MEA 22a together and discharging the fuel gas. By adopting this structure, it becomes possible to reduce the number of component parts, and assemble the fuel cell easily.

DESCRIPTION OF REFERENCE NUMERALS

10: fuel cell
12: lower housing member
14: support panel
16: upper housing member
18: fan attachment member
20: housing
22a: lower MEA
22b: upper MEA
24: electrolyte membrane
26: anode
28: cathode
36: An side groove
44: interconnecting section
48: Ca side groove
50: unit cell
52: An side film
54: Ca side film
56: laminate layer
60: first straight segment
62: second straight segment
64: An side breathing hole
66: Ca side breathing hole
70: air supply layer
72: lower protrusion
74: upper protrusion
76: fin
78a: upper air supply channel
78b: lower air supply channel
80: discharge duct
82: inlet duct
84: lower side hydrogen supply layer
86: upper side hydrogen supply layer
88: lower side hydrogen supply channel
90: onward channel
92: return channel
94: connection channel
96: upper side hydrogen supply channel
100: lower supply manifold
102: upper supply manifold
104: lower discharge manifold
106: upper discharge manifold
108: fan

What is claimed is:

1. A fuel cell comprising a first membrane electrode assembly and a second membrane electrode assembly,
the first membrane electrode assembly and the second membrane electrode assembly each comprising:
a single electrolyte membrane in which interconnecting sections are formed, the interconnecting sections extending in a first direction and having conductivity in a membrane thickness direction of the electrolyte membrane;
a plurality of anodes extending in the first direction, and disposed remotely from each other in a second direction perpendicular to the first direction; and
a plurality of cathodes extending in the first direction, and disposed remotely from each other in the second direction;

wherein the cathodes of the first membrane electrode assembly and the cathodes of the second membrane electrode assembly face each other;

each of the first membrane electrode assembly and the second membrane electrode assembly has a zigzag layout where, in the second direction, part of one of the anodes faces part of one of two cathodes that are adjacent to each other, among the cathodes, through the electrolyte membrane and another part of the one anode faces part of the remaining one of the two cathodes through one of the interconnecting sections formed in the electrolyte membrane;

the interconnecting sections of the first membrane electrode assembly and the interconnecting sections of the second membrane electrode assembly are offset from each other in the second direction;

the fuel cell further comprises an oxygen-containing gas supply layer for supplying an oxygen-containing gas to the cathodes of the first membrane electrode assembly and the cathodes of the second membrane electrode assembly;

in the oxygen-containing gas supply layer, a plurality of first protrusions which contact the cathodes of the first membrane electrode assembly and a plurality of second protrusions which contact the cathodes of the second membrane electrode assembly are provided alternately; and the first protrusions are positioned in a manner to press the interconnecting sections of the first membrane electrode assembly, and the second protrusions are provided in a manner to press the interconnecting sections of the second membrane electrode assembly.

2. The fuel cell according to claim 1, comprising a cathode side porous film interposed between the plurality of cathodes and the first protrusions or the second protrusions in a manner to cover the cathodes, wherein a breathing hole as a passage of the oxygen-containing gas is provided only at a position of the cathode side porous film spaced from the first protrusions or the second protrusions.

3. The fuel cell according to claim 1, wherein at positions in the cathodes or the anodes, or in both the cathodes and the anodes, where correspond to the interconnecting sections, the electrode catalyst layer is not present.

* * * * *